United States Patent
Yu et al.

(10) Patent No.: US 9,283,538 B1
(45) Date of Patent: *Mar. 15, 2016

(54) METHOD OF FABRICATING PELLETIZED MEDIUM-HIGH-TEMPERATURE $CO_2$ SORBENT OF CA—AL—$CO_3$

(71) Applicant: Institute of Nuclear Energy Research, Atomic Energy Council, Executive Yuan, R.O.C., Taoyuan County (TW)

(72) Inventors: Ching-Tsung Yu, Taoyuan County (TW); Wun-Syong Chen, Taoyuan County (TW); Huan-Ting Kuo, Taichung (TW)

(73) Assignee: INSTITUTE OF NUCLEAR ENERGY RESEARCH, ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/468,498

(22) Filed: Aug. 26, 2014

(51) Int. Cl.
| | |
|---|---|
| *C01B 31/14* | (2006.01) |
| *B01J 20/04* | (2006.01) |
| *B01J 20/22* | (2006.01) |
| *B01J 20/12* | (2006.01) |
| *B01J 20/20* | (2006.01) |
| *B01J 20/28* | (2006.01) |
| *B01J 20/30* | (2006.01) |

(52) U.S. Cl.
CPC ............... *B01J 20/043* (2013.01); *B01J 20/12* (2013.01); *B01J 20/20* (2013.01); *B01J 20/223* (2013.01); *B01J 20/2803* (2013.01); *B01J 20/3042* (2013.01)

(58) Field of Classification Search
CPC .............. C01B 31/14; C09C 1/58; C09C 1/60
USPC ........................................................ 23/314
See application file for complete search history.

(56) References Cited

U.S. PATENT DOCUMENTS

| | | | | |
|---|---|---|---|---|
| 8,168,156 B2 * | 5/2012 | Yu | ...................... | B01J 20/28007 423/593.1 |
| 8,207,086 B2 * | 6/2012 | Yu | .......................... | B01D 53/02 502/401 |
| 8,754,002 B2 * | 6/2014 | Yu | ........................... | C01F 7/004 252/184 |
| 9,089,837 B2 * | 7/2015 | Yu | ......................... | B01J 20/3078 |
| 9,108,859 B2 * | 8/2015 | Yu | .......................... | B01J 20/041 |

* cited by examiner

*Primary Examiner* — Edward Johnson
(74) *Attorney, Agent, or Firm* — Jackson IPG PLLC; Demian K. Jackson

(57) ABSTRACT

A sorbent for capturing $CO_2$ is fabricated. The sorbent is pelletized and used under a medium or high temperature. The sorbent is mainly made of aluminum calcium carbonate (Ca—Al—$CO_3$). The present invention has a controllable ratio for mixing Ca—Al—$CO_3$ with a release agent (magnesium stearate, MgSt) and a binder (activated carbon, cement or bentonite). The sorbent has a good performance for anti-degradation under a high temperature with 100% of $CO_2$. During 10 loops of use, 43.3~47.5% of $CO_2$ is captured with an initial amount up to 10 milli-moles per gram (mmol/g) and a stability ratio up to 91.2% maintained.

7 Claims, 3 Drawing Sheets

METHOD OF FABRICATING PELLETIZED MEDIUM-HIGH-TEMPERATURE $CO_2$ SORBENT OF CA—AL—$CO_3$

FIELD OF THE INVENTION

The present invention relates to fabricating a carbon dioxide ($CO_2$) sorbent; more particularly, relates to of fabricating the pellet of $CO_2$ sorbent via powder of calcium aluminum carbonate (Ca—Al—$CO_3$) with binder and additive through the manufacture step. The sorbent pellet produce with kilogram grade per batch, and has mechanical strength and stability enhanced while being used at a high temperature.

BACKGROUND OF THE INVENTION

According to the scenario analysis (for 2010) with the assessment made by International Energy Agency (IEA), for mitigating the greenhouse effect by maintaining the rise of the global temperature at 2 celsius degrees (° C.) until 2050 (2 Degree Scenario, 2DS), $CO_2$ capture and storage (CCS) is one of the most effective carbon reduction technologies with a 14-percents (%) carbon reduction contribution. Capturing $CO_2$ from stationary sources, such as coal (gas)-fired power plants, petrochemical plants, cement plants, steel mills, is the most effective $CO_2$ reduction technology. These sources will make $CO_2$ emissions having high concentrations. After evaluating the $CO_2$ capture technologies (such as alkanolamine) for post-combustion by U.S. NETL, about 30% of power consumption is figured out, which is much higher, about 10%, than that of $CO_2$ capture technologies for pre-combustion. Hence, developing solid-state $CO_2$ sorbents for the latter technologies would gain environmental benefits. For example, Patent US 20120025134 A1 synthesizes calcium oxide/magnesium oxide (CaO/MgO) to maintain $CO_2$ conversion more than 90% at 800~900° C. for 600 minutes (min) (under 15% of $CO_2$). Another prior art uses metal oxide, such as CaO, for $CO_2$ capture, which removes 99~100% of $CO_2$ at 650° C. (under 13~16% of $CO_2$). The above high-temperature $CO_2$ sorbents is used under $CO_2$ concentration less than 16%. However, with the same mass of gas, $CO_2$ capture under a concentration of 40~50% is more effective than that under 8~15%.

In summary, disadvantages of the prior arts include:

1. The $CO_2$ sorbents made with solvents through wet scrubbing and amine modification are used for lower $CO_2$ concentrations around 5~15% under low temperature around 20~150° C. These $CO_2$ sorbents have characteristics of big energy penalty, high regeneration energy, small carbon capacity and environmental harming.

2. Powders of natural CaO-containing minerals, like limestone (limestone), calcium carbonate ($CaCO_3$) and serpentine, have poor stability. When they are used for capturing $CO_2$ under medium-high temperature, the $CO_2$ concentration should be less than 10% and the applications are for post-combustion. If they are used for pre-combustion (under 15~40% of $CO_2$), stability becomes poor and performance of $CO_2$ capture rapidly declines.

3. The powders of synthesized $CO_2$ sorbents are prone to problems of aggregation and structural embrittlement while being used for capturing $CO_2$ at medium-high temperature under high steam and high $CO_2$ concentration. Therefore, their characteristics on $CO_2$ capture cannot be acquired in reactors and a proper granulation technology is required to enhance their mechanical strength and stability.

Hence, the prior arts do not fulfill all users' requests on actual use.

SUMMARY OF THE INVENTION

The main purpose of the present invention is to provide a powder of $CO_2$ sorbent of Ca—Al—$CO_3$ through a kilogram-class batch manufacture with mechanical strength and stability enhanced, where the $CO_2$ sorbent is used in a kilowatt (kW)-class high-temperature $CO_2$ capturing reactor under a high temperature.

Another purpose of the present invention is to provide a pelletized high-temperature $CO_2$ sorbent having characteristics of wide operating temperature range, high $CO_2$ concentration (10~40%), high carbon capturing amount (>50 wt %), environmental protection and low energy consumption.

Another purpose of the present invention is to provide a pelletized medium-high-temperature $CO_2$ sorbent of Ca—Al—$CO_3$, which is used for capturing $CO_2$ in pre-combustion and post-combustion and is prevented from degradation like a CaO sorbent used under high temperature.

Another purpose of the present invention is to provide a pelletized $CO_2$ sorbent for capturing $CO_2$ under a medium-high temperature (600~800° C.) and a high concentration (during 5~100%).

To achieve the above purposes, the present invention is a method of fabricating a pelletized medium-high-temperature $CO_2$ sorbent of Ca—Al—$CO_3$, comprising steps of (a) synthesizing a powder of Ca—Al—$CO_3$ by coprecipitation; and (b) mixing the powder of Ca—Al—$CO_3$ with 1~10 wt % of a release agent and 1~10 wt % of a binder to form a pelletized $CO_2$ sorbent through pelletization. Accordingly, a novel method of fabricating a pelletized medium-high-temperature $CO_2$ sorbent of Ca—Al—$CO_3$ is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
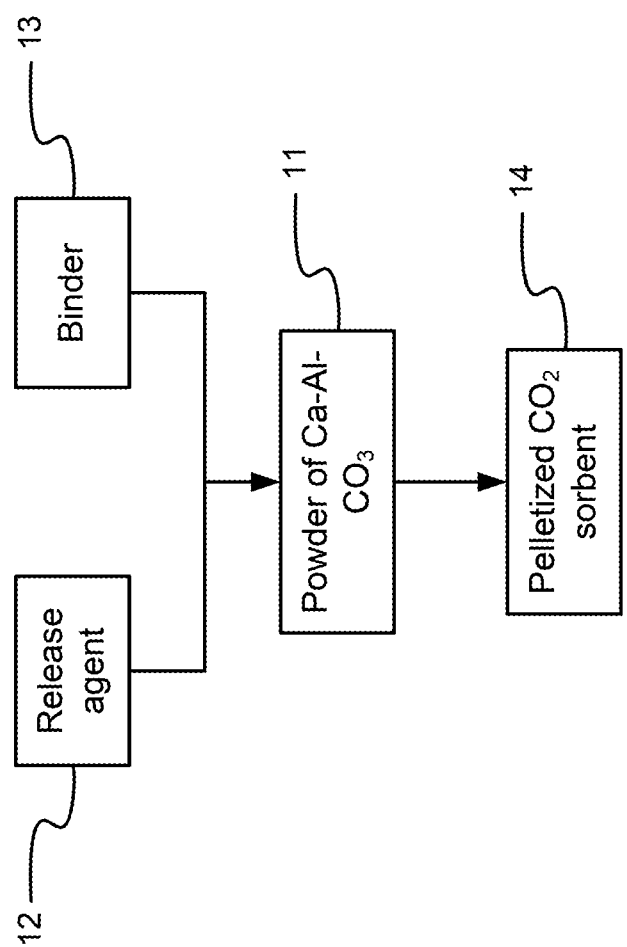
FIG. 1 is the flow view showing the preferred embodiment according to the present invention.
Figure 2:
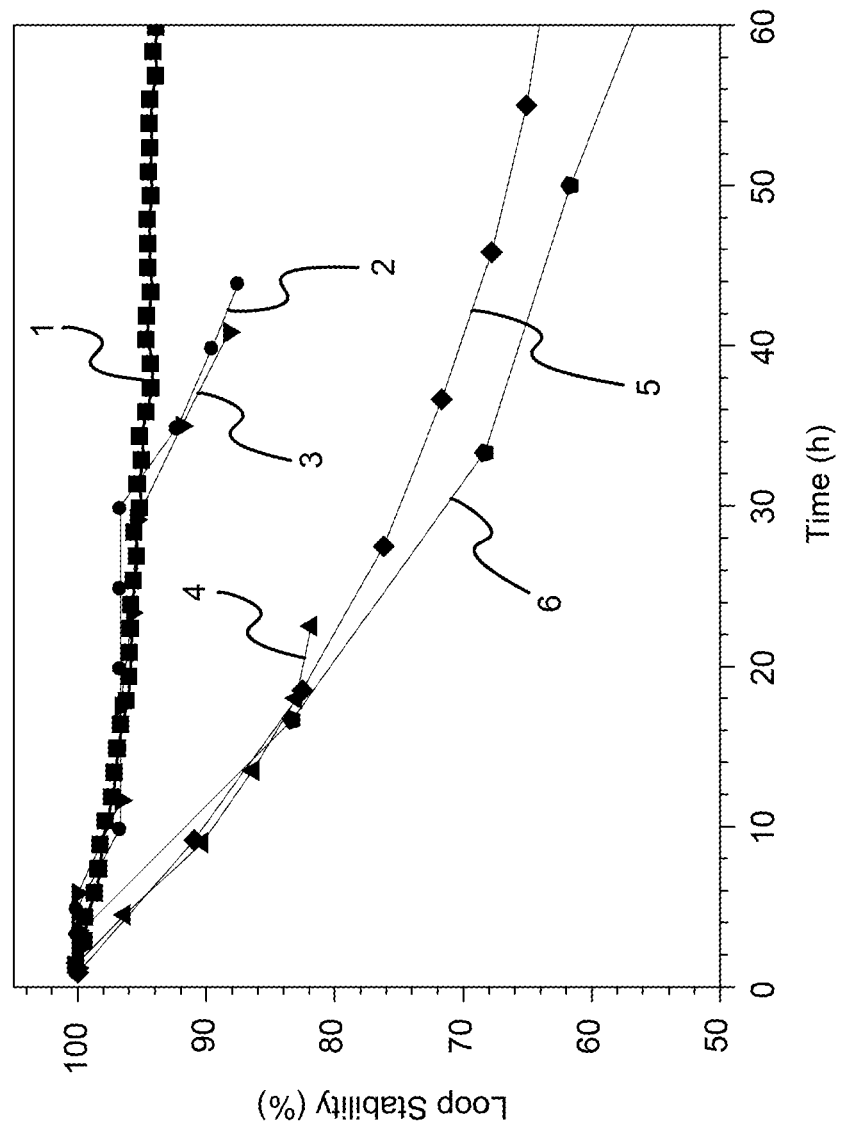
FIG. 2 is the view showing the performance of the $CO_2$ sorbent of Ca—Al—$CO_3$ used for a long time.
Figure 3:
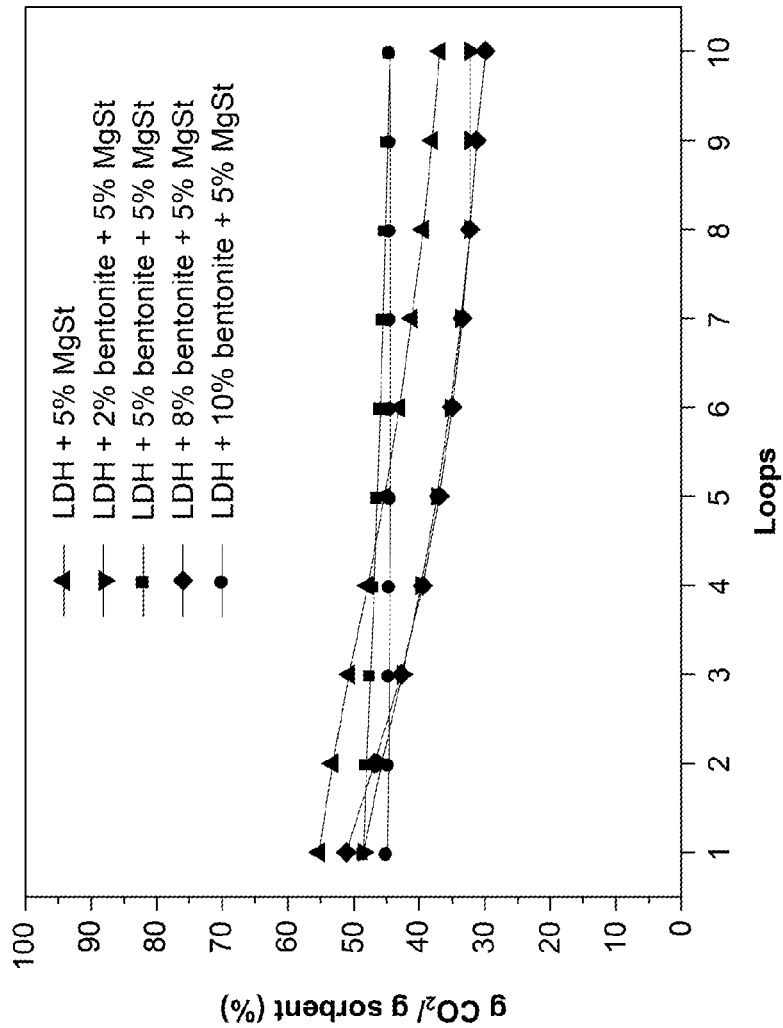
FIG. 3 is the view showing the stability of the $CO_2$ sorbent in 10 loops of use.

Please refer to FIG. 1 to FIG. 3, which are a flow view showing a preferred embodiment according to the present invention; a view showing performance of a carbon-dioxide ($CO_2$) sorbent of calcium aluminum carbonate (Ca—Al—$CO_3$, LDH) used for a long time; and a view showing stability of the $CO_2$ sorbent in 10 loops of use. As shown in the figures, the present invention is a method of fabricating a pelletized medium-high-temperature $CO_2$ sorbent of Ca—Al-$CO_3$, comprising the following steps:

(a) A powder of Ca—Al—CO$_3$ (LDH) 11 is synthesized by coprecipitation.

(b) The powder of Ca—Al—CO$_3$ 11 is mixed with 1~10 weight percents (wt %) of a release agent 12 and 1~10 wt % of a binder 13 to synthesize a pelletized CO$_2$ sorbent 14 through pelletization.

Therein, the release agent 12 is made of magnesium stearate (MgSt) to release the CO$_2$ sorbent 14 from a mold for forming the pelletized CO$_2$ sorbent 14; and the binder 13 is made of activated carbon, cement or bentonite for binding the powder of Ca—Al—CO$_3$ 11.

Thus, a novel method of fabricating a pelletized medium-high-temperature CO$_2$ sorbent of Ca—Al—CO$_3$ is obtained.

In step (a), a plurality of acidic solutions are made with a calcium precursor (Ca(OAc)$_2$) and aluminum nitrate (Al(NO$_3$)$_3$), where a molar ratio of calcium to aluminum (Ca:Al) is 7:1. Then, an alkaline solution is made with 1.6 moles (M) of sodium hydroxide (NaOH) and 0.1 M of sodium carbonate (Na$_2$CO$_3$). The acidic solutions are mixed with the alkaline solution to form a mixed solution by stirring. After being filtered and dried, the mixed solution is put in a furnace to be calcined at a temperature of 600 celsius degrees (° C.) for obtaining powder of Ca—Al—CO$_3$. In FIG. 2, a curve 1 shows performance of the powder of Ca—Al—CO$_3$ used for a long time, while the other curves 2~6 show performance of the other CO$_2$ sorbents. Therein, the CO$_2$ sorbent fabricated according to the present invention shows a stability ratio higher than 90 percents (%) for 100 loops of use.

The CO$_2$ sorbent fabricated according to the present invention has an adjustable ratio for contents, where the contents can be chosen from low-cost common materials. For example, the original sources of the release agents (i.e. MgSt) and the binders (i.e. activated carbon, cement or bentonite) and their ratios can be varied. Besides, the sources and ratios of the release agents and binders would significantly affect CO$_2$-capturing volume of the sorbents and their stability after loops of use. Therein, the amount of the release agent and binder added in the Ca—Al—CO$_3$ powder may vary up to 10 to 20 times. In another word, the release agent and binder added in the Ca—Al—CO$_3$ powder should be less than 10~20%. In the preferred embodiment, 1~10 wt % of the release agent and 1~10 wt % of the binder is added, where the binder is bentonite for obtaining pellets of the medium-high-temperature CO$_2$ sorbent with a preferably ratio of 1:0.05:0.05 of the Ca—Al—CO$_3$ powder, the release agent and the binder. On using the CO$_2$ sorbent, the Ca—Al—CO$_3$ powder, 5 wt % of the release agent and 2~10 wt % of bentonite are synthesized and the pelletized CO$_2$ sorbent obtains high CO$_2$ capture ability and excellent stability. In FIG. 3, under 750° C. and a high concentration of 100% of CO$_2$, the CO$_2$ sorbent shows good resistance to degradation, where the amount of CO$_2$ captured maintains 43.3~47.5% with an initial amount up to 10 milli-moles per gram (mmol/g) and a stability ratio up to 91.2% after 10 loops of use. Hence, the present invention obtains more than 90% technical indicators, which reaches standard international indicators.

The present invention can be combined with existing technologies for kilogram-class batch manufacture of pelletized CO$_2$ sorbents with mechanical strength and stability enhanced. The CO$_2$ sorbent fabricated according to the present invention is used for developing a kilowatt(kW)-class high-temperature CO$_2$ capturing reactor for wide temperature-range applications with characteristics of a high CO$_2$ concentration (10~40%), a high amount of CO$_2$ captured (>50 wt %), environmental protection and low energy consumption. The present invention can be used for capturing CO$_2$ in pre-combustion and post-combustion for preventing degradation like a calcium-oxide (CaO) sorbent used under a high temperature. Hence, the present invention can be used for developing a CO$_2$ sorbent for a wide concentration range (from 5~100% of CO$_2$) under medium-high temperature (600~800° C.).

To sum up, the present invention is a method of fabricating a pelletized medium-high-temperature CO$_2$ sorbent of Ca—Al-CO$_3$, where existing technologies can be combined for kilogram-class batch manufacture of pelletized CO$_2$ sorbents with mechanical strength and stability enhanced; the CO$_2$ sorbent is used for developing a kW-class high-temperature CO$_2$ capturing reactor for wide temperature-range applications with characteristics of a high CO$_2$ concentration, a high amount of CO$_2$ captured, environmental protection and low energy consumption; and the present invention can be used for capturing CO$_2$ in pre-combustion and post-combustion for preventing degradation like a CaO sorbent used under a high temperature.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of fabricating a pelletized medium-high-temperature carbon-dioxide (CO$_2$) sorbent of calcium aluminum carbonate (Ca—Al—CO$_3$), comprising steps of:
   (a) obtaining a powder of calcium aluminum carbonate (Ca—Al—CO$_3$) by coprecipitation; and
   (b) mixing said powder of Ca—Al—CO$_3$ with 1~10 wt % of a release agent and 1~10 wt % of a binder to obtain a pelletized carbon dioxide (CO$_2$) sorbent through pelletization.

2. The method according to claim 1,
wherein said release agent is made of magnesium stearate (MgSt).

3. The method according to claim 1,
wherein said binder is made of a material selected from a group consisting of activated carbon, cement and bentonite.

4. The method according to claim 1,
wherein, in step (a), a plurality of acidic solutions are obtained with a calcium precursor (Ca(OAc)$_2$) and aluminum nitrate (Al(NO$_3$)$_3$); a molar ratio of calcium to aluminum (Ca:Al) in said acidic solutions is 7:1; an alkaline solution is obtained with sodium hydroxide (NaOH) and sodium carbonate (Na$_2$CO$_3$); said acidic solutions are mixed with said alkaline solution with stirring to obtain a mixed solution; and, filtering said mixed solution to be dried and calcined in a furnace to obtain said powder of Ca—Al—CO$_3$.

5. The method according to claim 1,
wherein said release agent and said binder are added at an amount less than 10~20% in said powder of Ca—Al—CO$_3$.

6. The method according to claim 1,
wherein said pelletized CO$_2$ sorbent keeps absorbing an amount of 43.3~47.5% of CO$_2$ during 10 loops of CO$_2$-absorbing.

7. The method according to claim 1,
wherein said pelletized CO$_2$ sorbent has a starting amount of 10 milli-moles per gram (mmol/g) of CO$_2$ absorbed at a high concentration of 100 percents (%) of CO$_2$.

\* \* \* \* \*